Dec. 17, 1968  A. LENKEI  3,416,724

LOW RESISTANCE STRIP VALVE

Filed July 21, 1966  2 Sheets-Sheet 1

ANDREW LENKEI
INVENTOR.

BY Daniel H. Bobis
Atty

Dec. 17, 1968   A. LENKEI   3,416,724
LOW RESISTANCE STRIP VALVE

Filed July 21, 1966   2 Sheets-Sheet 2

ANDREW LENKEI
INVENTOR.

BY Daniel H. Bobis
Atty

United States Patent Office 3,416,724
Patented Dec. 17, 1968

3,416,724
LOW RESISTANCE STRIP VALVE
Andrew Lenkei, Buffalo, N.Y., assignor to Worthington Corporation, Harrison, N.J., a corporation of Delaware
Filed July 21, 1966, Ser. No. 566,798
4 Claims. (Cl. 230—228)

ABSTRACT OF THE DISCLOSURE

A valve is provided which comprises a flow passage extending therethrough having substantially smooth, continuous walls; and a valve means which is operative in said flow passage to regulate the flow therethrough. The valve means includes a resilient valve member which opens and closes in response to the differential pressure thereacross and which is designed to essentially preserve the continuity of the said flow passage walls to thereby minimize disturbances of the fluid flow through the valve.

---

This invention relates generally to a fluid actuated automatic valve for use in controlling the flow of fluid under pressure, and more particularly, to a plate or strip valve which offers low resistance to fluid flow when open and which operates to regulate the flow of fluid through the valve automatically according to the pressure differential across the valve member.

In apparatus for handling fluids under pressure, such as compressors and pumps, fluid actuated valves, such as check valves, which open and close automatically in response to fluctuating fluid pressure demands in the flow passages of such apparatus, are frequently used. One such type of automatic fluid actuated valve is the plate or strip valve. This type of valve is generally used in reciprocating compressors, as an intake or exhaust valve in cooperation with the piston and cylinder arrangement of said compressors.

The plate or strip valve comprises a strip of metal or other suitable material which acts against a valve seat under the influence of either its own resiliency or the force of an external spring attached thereto, to maintain the valve normally closed. If such a valve were to be placed in the discharge line of a fluid pressure system to control the flow of fluid therethrough, an increase in line pressure on the upstream side of the valve, would cause the valve member to flex away from the valve seat, thereby opening the valve and allowing fluid to flow through the line.

When the fluid pressure on the upstream side of the valve returned to normal, the resiliency of the valve member, or the force of the external spring associated therewith, would cause the valve member to close against the valve seat. Thus the valve would act as a check valve to permit the flow of fluid when the upstream pressure was greater than the downstream pressure, and to prevent the flow of fluid from the downstream side of the upstream side of the discharge line, when the downstream pressure exceeded the upstream pressure.

The operation of this device in a compressor can be readily understood. If, for example, the valve was placed on the discharge side of the cylinder of a reciprocating compressor, fluid would be discharged through the open valve at the end of the compression stroke, and the valve would snap closed during the intake stroke to prevent air from being drawn back into the compressor, in much the same manner as a check valve.

In the prior art the configuration of this type of strip valve, and the disposition of the flexible valve member in the flow passage, has offered a relatively large resistance to fluid flow. This resistance was due to sudden directional changes made by the fluid in flowing passed the valve portion of the flow passage, and also was due to changes in the cross-sectional area of the flow passage. In particular, the configuration of the flow passage of the prior art valves, in the vicinity of the valve seat, was such as to make the fluid flowing therethrough turn sharp corners, often at right angles to the direction of flow, and, in general, the fluid followed a discontinuous path whereby the fluid became separated at the boundry layers from the walls of the flow passages. Thus, these directional changes and flow area changes, resulted in turbulent flow conditions, which in turn resulted in loss of power.

The present invention overcomes the disadvantages of the prior art, by providing a flow passage through the valve body which has smooth continuous walls, and a valve means operative in said flow passage to regulate the flow therethrough, which means comprises a resilient valve member which opens and closes in response to the differential pressure across the valve means and which valve member essentially preserves the continuity of the flow passage surfaces, thereby minimizing fluid disturbances due to interruptions in the smooth continuous surfaces of the flow passage.

Accordingly, it is an object of this invention to provide a low resistance strip valve for use in compressors and other types of fluid pressure handling apparatus.

It is another object of this invention to provide a fluid actuated valve which automatically regulates the flow of pressure fluid through a passage in response to the differential pressure across the valve means, wherein the valve means offers a smooth streamline passage to provide essentially laminar flow therethrough.

These and other objects of this invention will become evident from the following description with reference to the accompanying drawings in which.

Figure 1:
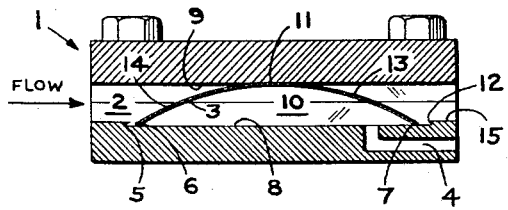
FIGURE 1 is a cross section of a valve body showing the valve member as an embodiment of this invention.

Referring to the drawings, FIGURE 1 shows in cross section a valve body generally designated 1 with a flow passage 2 therethrough. The direction of flow of pressure fluid is indicated by the arrow. The valve member 3 separates the area of high pressure on the inlet side of the flow passage from the area of low pressure on the outlet side of the flow passage, and prevents fluid flow therebetween. The valve member 3, in this particular embodiment, comprises a curved steel strip forming an arc shaped leaf spring which, as shown in assembled position, has already been compressed to some degree in order to maintain the valve closed.

This initial compression of the steel spring valve member 3 also prevents the outlet pressure from causing fluid to flow over the convex portion 11 of the valve member 3 when the inlet pressure drops below the discharge pressure, by maintaining the convex portion 11 in contact with the upper portion 9 of the flow passage, which upper portion 9 serves as the valve seat.

A relief passage 4 is provided to vent the space 10 beneath the concave strip 3 to the outlet pressure in the outlet portion of the flow passage 2. Because of this vent, the pressure is equal on both the convex and concave sides of outlet portion 13 of the valve member 3; while the pressure is unequal on the convex and concave sides of the inlet portion 14 of the valve member 3.

The inlet edge 6 and the outlet edge 7 of the valve member 3 are disposed to slide in a groove 8 in a surface of the passage 2. The groove 8 is formed with a lip 5 at the inlet end. This lip prevents the inlet edge 6 of the valve member from being lifted out of the groove 8 by an excessive outlet pressure, i.e., an outlet pressure which exceeds both the inlet pressure and the force due to the initial compression of the spring. Were such an excessive outlet pressure to act upon the valve member 3, it would cause the valve member 3 to slide to the left and engage the lip 5. The outlet pressure acting beneath the concave inlet portion 14 of the valve member 3, would force the convex surface of the valve member 3 against the lip 5 and the upper surface 9 of the flow passage, thereby effecting a seal.

Figure 2:
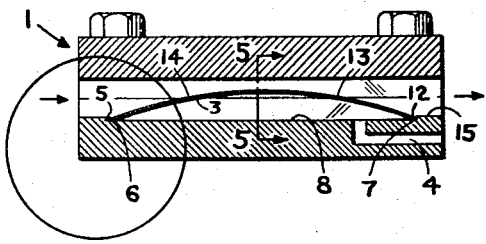
FIGURE 2 shows the embodiment of FIGURE 1 wherein the valve is in the open position.

When the inlet pressure exceeds the outlet pressure, the steel strip forming the closing arch partially collapses permitting air to flow as in FIGURE 2. The edges 6 and 7 of the valve member 3, slide in the groove 8 to accommodate the depression or flattening of the valve member.

Figure 3:
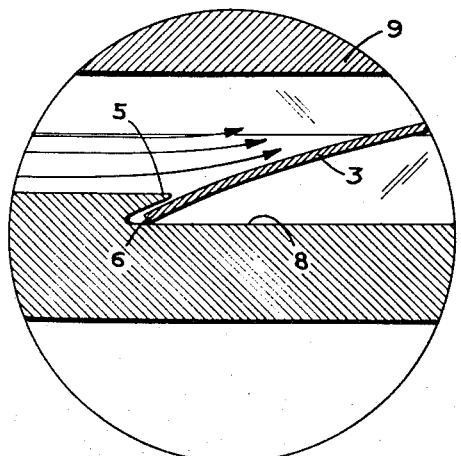
FIGURE 3 is a detail of that portion encircled in FIGURE 2.

The edge 7 of the valve member, abuts against the edge 12 of the groove 8, while the edge 6 of the valve member approaches the lip 5. The surface of the convex outlet portion 13 of the valve member is essentially contiguous with the inner surface 15 of the outlet passage (FIGURE 2), so that there is a minimal interruption in the continuity of the surface of the flow passage as a whole. Likewise, the change of direction of fluid flow in the passage 2 adjacent to the lip 5 and the edge 6 of the valve member is minimized by the small curvature of the flattened arch, the close juxtaposition of the lip 5 and the edge 6, and the tapered design of the lip itself (see FIGURE 3). Thus, the partially collapsed arch in cooperation with the inner surface of the flow passage, offers a smooth, streamlined passage through which the fluid can flow with very low resistance.

Figure 4:
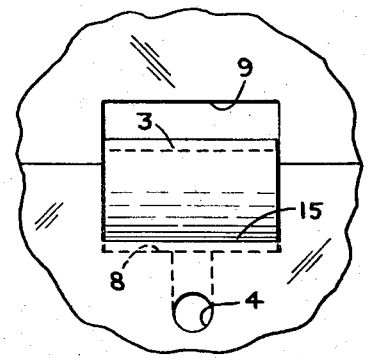
FIGURE 4 is an end view of the elevation shown in FIGURE 2.

The arrows (FIGURE 3) indicate the type of smooth continuous and undisturbed flow that is possible with this type of valve. It will be noted from FIGURE 4 that the cross sectional area 17 of the flow passage 2 remains uniform in configuration. This uniformity of the flow area, together with the smooth almost continuous surface presented by the flow passage in cooperation with the valve member 3, both on the input and outlet sides (see FIGURES 2 and 3) of the valve member, make possible essentially laminar flow patterns in the flow passage. The lack of discontinuity virtually eliminates turbulence.

Figure 5:
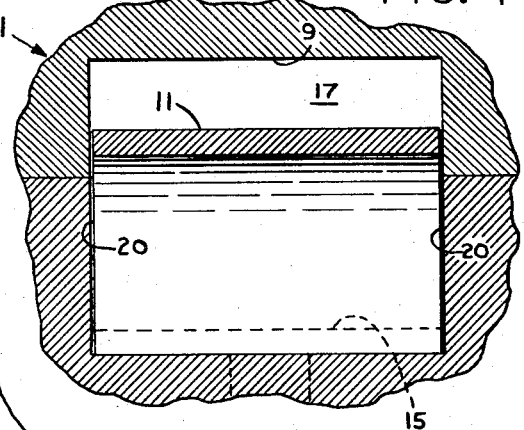
FIGURE 5 is a cross section taken along the line 5—5 of FIGURE 2.
Figure 6:
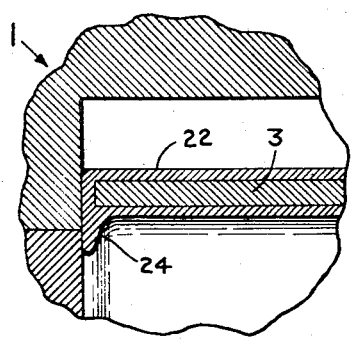
FIGURE 6 is a fragmentary view of an alternative embodiment of the valve member shown in FIGURE 5.

Referring to FIGURE 5 note that a small clearance 20 is necessary between the sides of the steel strip valve member 3 and the valve body 1, to permit the valve member to freely flex. This clearance can be virtually eliminated by placing Teflon coating 22 about the steel strip as shown in FIGURE 6, thereby providing a sliding fit. Other materials may be used, but Teflon is preferable since it is self-lubricating and is therefore excellent for cryogenic services, wherein the valve must operate without lubrication. Also, Teflon has good mechanical strength and has the mechanical property of "wearing in," so that there is no need for great accuracy in manufacturing the strip.

The Teflon lip 24 shown in the figures, provides a greater edge surface for the strip and therefore, a better seal with the mating surface of the passage. It is also useful in centering the strip in the passageway.

Figure 7:
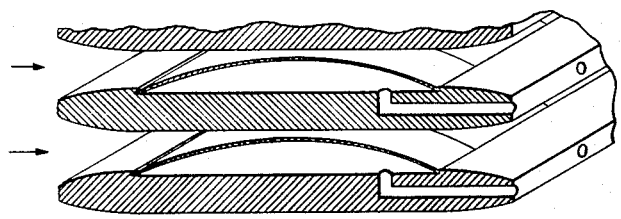
FIGURE 7 shows a perspective view in section of a multiple valve assembly.

FIGURE 7 shows an alternative configuration wherein the strip valves have been stacked to form a larger unit. In this matter they may be used effectively in high capacity services, such as suction and discharge valves for reciprocating compressors.

Figure 8:
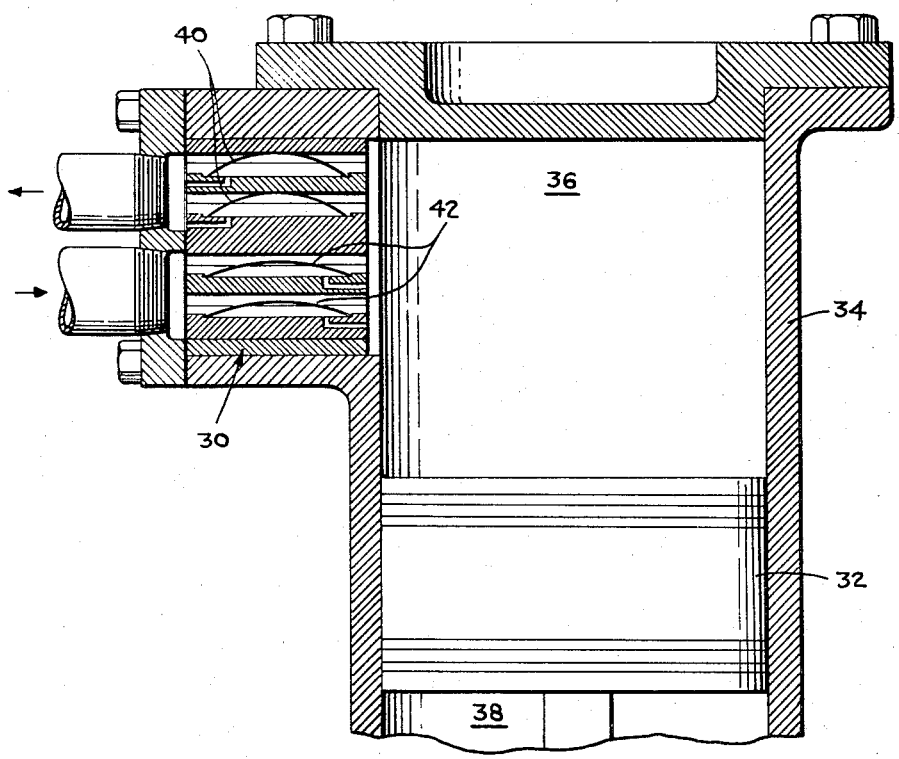
FIGURE 8 shows a valve assembly in cooperative relation with a piston-cylinder arrangement in a reciprocating compressor.

FIGURE 8 shows such a unit 30 in place in a reciprocating compressor. Only the piston 32 and the cylinder 34 of the compressor are shown for the sake of simplicity, but it should be understood that any type of reciprocating compressor or other reciprocal device could be used in conjunction therewith. It should, further, be understood, that the valve is not limited to use in conjunction with reciprocating fluid handling devices, but has general applicability as a valve in many types of fluid systems.

The cylinder 34 has a head end 36 and a crank end 38. The valve unit 30 shown acts as both the suction and discharge valve. As the piston 32 moves toward the crank end 38 on the suction stroke of the compressor, the plurality of valve members 40 close and prevent the flow of air or other fluid into the cylinder 34. While the plurality of valve members 42 open and permit the flow of fluid into the cylinder 34. When the piston moves toward the head end 36 of the cylinder 34 on the compression stroke of the compressor, the valve members 40 open to permit the discharge of the compressed fluid while the valve members 42 close.

The valve members 40 and 42 may be designed to open at a predetermined pressure by any well known method of predetermining the spring force of a curved spring or a strip valve member.

*Operation*

In operation the valve member 3 normally blocks the flow of air through the flow passage 2 when the pressure on the inlet side is equal to or less than the pressure on the outlet side. This is accomplished by the mating of the sealing surfaces of the valve member with the walls of the flow pasage 2, which surfaces are held in contact by the inherent resiliency of the valve member resulting from its preflexed state. When the inlet pressure exceeds the outlet pressure the valve member forming the closing arch collapses, permitting fluid to flow through the flow passage in a uniform state over essentially continuous surfaces.

When the inlet pressure returns to its initial state, the resilient valve member again closes the passage and prevents further fluid flow in either direction as previously explained.

It will be understood that various changes in the details, materials and arrangements of parts which have been herein described and illustrated in order to explain the nature of the invention may be made by those skilled in the art within the principle and scope of the invention as expressed in the appended claims.

I claim:

1. In a reciprocal compressor:
   a cylinder;
   a piston disposed therein in operative association therewith;
   a valve disposed on said cylinder to cooperate with said piston and cylinder to regulate the flow of fluid entering and leaving said cylinder, said valve comprising a body having at least one flow passage therethrough with the walls of said flow passage being smooth and continuous, and a valve means disposed in said flow passage to automatically permit fluid to flow in one direction only across said member in response to differential pressure exerted by the fluid in said passage while maintaining the continuity of said flow passage;
   there being a plurality of flow passages and valve means which automatically regulate both the suction and discharge of fluids in said cylinder, said valve means comprising resilient arc shaped members disposed in said flow passages so that fluid will flow over the convex portions of their respective arc shaped surfaces in the direction of propagation of the arc.

2. A reciprocal compressor as in claim 1 wherein:
   seat means are formed in said flow passages to contact the respective resilient members disposed therein; and
   said resilient arc shaped members are pre-flexed to normally contact their respective seal means thereby biasing said valves normally closed.

3. A valve comprising:
a body having a flow passage therethrough, the walls of said flow passage being substantially smooth and continuous; and
a valve means disposed within said flow passage to regulate the flow of fluid therethrough while maintaining the continuity of said flow passage;
said valve means comprising a resilient valve member which is disposed to permit fluid flow in one direction only in response to differential pressure across said member;
said valve member in turn comprising a strip of flat material preshaped so that the flat surface thereof forms an arc, means formed in said flow passage for retaining the edges of said strip forming the ends of said arc, the convex surface of said strip being normally in contact with a surface of said flow passage, and means to communicate that portion of the flow passage disposed between the concave surface of the strip and the surface of the flow passage with the outlet side of said passage to equalize the pressure therebetween.

4. A valve means as in claim 3 wherein:
said strip comprises a laminate including a core of resilient material and an outer covering of sealing material.

References Cited

UNITED STATES PATENTS

| | | | |
|---|---|---|---|
| 978,152 | 12/1910 | Gutermuth | 137—525.5 |
| 1,375,252 | 4/1921 | Huff | 137—525 |
| 1,492,599 | 5/1924 | Hildebrand. | |
| 2,588,261 | 3/1952 | Magdeburger | 230—172 |
| 2,585,863 | 2/1952 | Smith. | |
| 2,881,795 | 4/1959 | Waldenmaier et al. | 137—525.3 |

FOREIGN PATENTS

| | | |
|---|---|---|
| 1,119,666 | 4/1956 | France. |
| 880,986 | 6/1953 | Germany. |
| 1,121,902 | 5/1956 | France. |

HENRY F. RADUAZO, *Primary Examiner.*

U.S. Cl. X.R.

137—525